Figure 1:
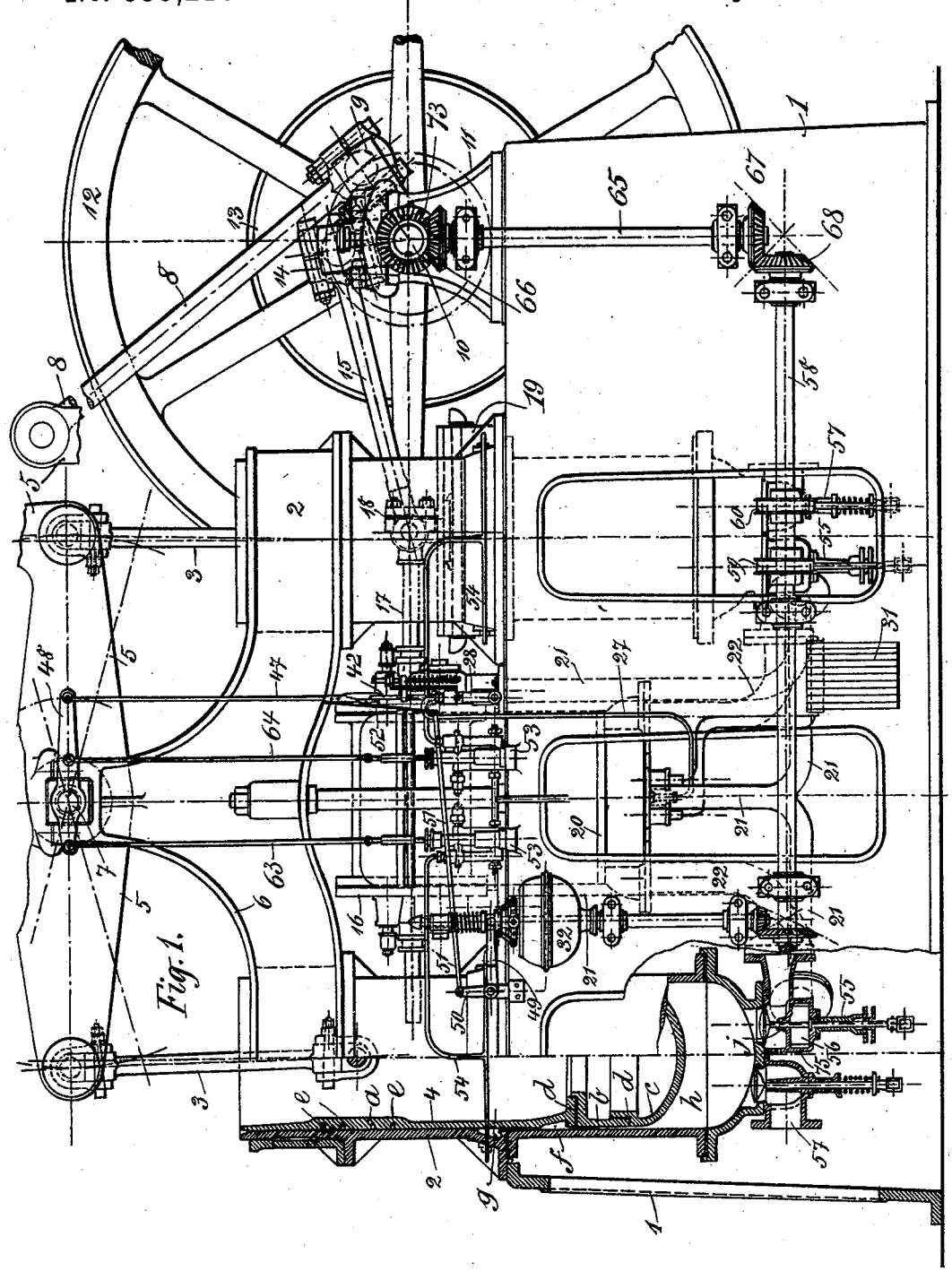

(No Model.) 3 Sheets—Sheet 1.

W. P. ARSCHAULOFF.
CALORIC ENGINE.

No. 539,213. Patented May 14, 1895.

Witnesses:
Richard C. Maxwell
Louis Winterberger

Inventor:
Wadim Pawlowitch Arschauloff
By J. Walter Douglass.
Attorney (No Model.) 3 Sheets—Sheet 2.
W. P. ARSCHAULOFF.
CALORIC ENGINE.

No. 539,213. Patented May 14, 1895.

Fig. 2.

Witnesses:
Richard C. Maxwell
Louis Winterberger

Inventor:
Wadim Pawluwitsch Arschauloff,
By J. Walter Douglass.
Attorney (No Model.) 3 Sheets—Sheet 3.

W. P. ARSCHAULOFF.
CALORIC ENGINE.

No. 539,213. Patented May 14, 1895.

Witnesses:
Richard C. Maxwell
Louis Winterberger

Inventor:
Wadim Pawlowitch Arschauloff,
By J. Walter Douglass,
Attorney

UNITED STATES PATENT OFFICE.

WADIM PAWLOWITCH ARSCHAULOFF, OF ST. PETERSBURG, RUSSIA.

CALORIC-ENGINE.

SPECIFICATION forming part of Letters Patent No. 539,213, dated May 14, 1895.

Application filed June 9, 1894. Serial No. 514,020. (No model.)

*To all whom it may concern:*

Be it known that I, WADIM PAWLOWITCH ARSCHAULOFF, a subject of the Czar of Russia, residing at St. Petersburg, Russia, have invented certain new and useful Improvements in Caloric-Engines, of which the following is a specification.

My invention has relation to caloric engines and in such connection it relates to that class of hot air engines, and more particularly to the construction and arrangement of such an engine for various purposes.

Hitherto caloric engines have not been generally employed, because in order to secure the required motive power therefrom much complicated mechanism has been connected therewith, which has rendered the same cumbersome and wasteful. Moreover, the speed of such engines has not been controllable with any degree of certainty, due to the fact that the air has been supplied to the cylinders direct, which interfered with the working of the engine, because the air could not be uniformly heated and maintained in such condition as to insure in practice continuous working thereof and the heat was inefficient to permit of increase in the speed of the engine *ad libitum* to meet requirements upon the same. Further, the packings of such engines, as well as the sliding surfaces coming in direct contact with the heated air and extraneous matter, such as grit or the like from the heater thereof induced wearing friction on the parts to such an extent as that lubrication of those parts has proven ineffectual in practice to insure continuous working of such an engine or of the driving of the same to a maximum capacity without much expense attending constant repairs that become necessary to make thereto.

The principal objects of my invention are, first, to construct a caloric engine in which the parts thereof are so arranged as to overcome the obstacles heretofore presented in the use of such engines by employing mechanism in connection therewith of comparatively simple and durable construction and efficient in action for insuring required motive power therefrom with the least amount of friction on the working parts thereof; second, to provide a caloric engine with greater cylinder capacity and of required horse power and with the mechanism of the engine simplified for insuring smooth running with the space occupied by such engine reduced in proportion to the capacity thereof; third, to provide a caloric engine having mechanism so arranged as that grit or extraneous matter do not contact with the working parts of the cylinders of the engine, so that undue wear of the parts is obviated; fourth, to provide a caloric engine with means adapted for containing an inflammable liquid or gas for imparting heat to impelling air separate from the cylinders of the engine and the said heated air communicated to the cylinders for actuating the working parts of the engine therefrom; fifth, to provide a caloric engine with means to control the supply of inflammable liquid or gas for effecting the working of the engine, and, sixth, to provide a caloric engine having the parts thereof greatly simplified for effective action with friction reduced to a minimum on the sliding members thereof and with extraneous matter prevented from interfering with the lubricated working parts of the engine, thus avoiding any retarding influences upon the same in the operation thereof and increasing the motive power derived therefrom with an economical expenditure of the said impelling medium adapted to impart motion to the working parts of the engine.

My invention consists of the improvements in caloric engines constructed and arranged for operation in substantially the manner hereinafter described and claimed.

The nature and scope of my invention will be more fully understood from the following description taken in connection with the accompanying drawings forming part hereof, and in which—

Figure 5:
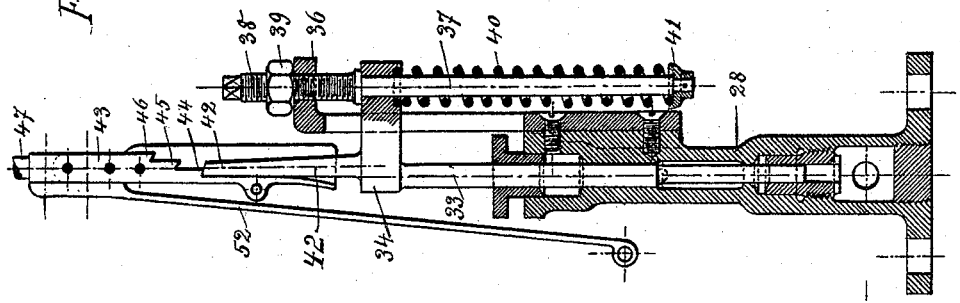
Figure 4:
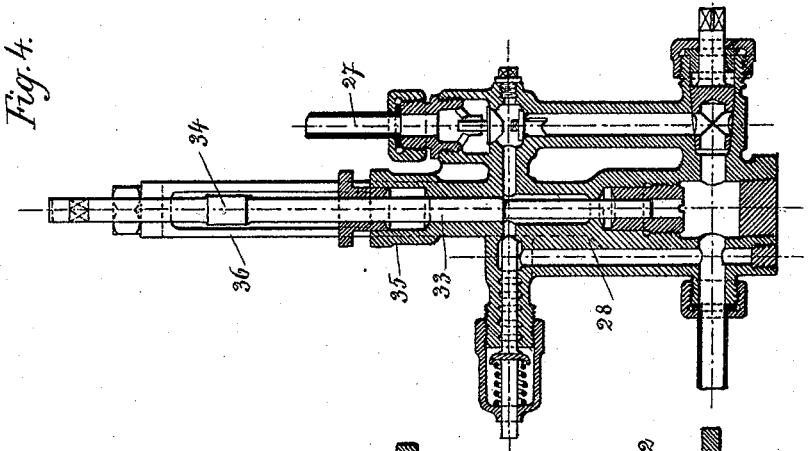
Figure 3:
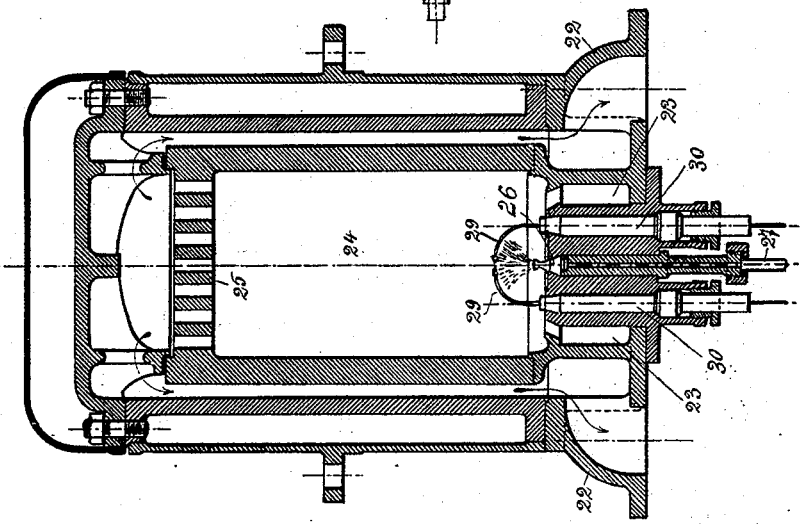

Figure 1 is a view, partly in side elevation and partly in section, of a caloric-engine embodying the features of my invention. Fig. 2 is a top or plan view thereof. Fig. 3 is a vertical section of a heater for supplying the cylinders of the engine with hot air, and Figs. 4 and 5 are vertical sections of a pump adapted to supply the heater of Fig. 3 with inflammable fluid or gas for heating the impelling air of the engine.

Referring to the drawings, 1 is a standard of the engine, to which is secured in a vertical position the working cylinders 2, 3, are the connecting rods, one of the ends of which are attached to the pistons 4, of the cylinders 2, and the other ends are connected with the walking beam 5, which is held in position by carrier supports 6. These carrier supports have a transverse shaft 7, in engagement therewith and on which is mounted the rocking beam 5, having a range of reciprocating movement in connection with said shaft.

8, is a connecting rod, one end of which is attached to the beam 5, and the other end to a crank 9, of the main driving shaft 10, which is pivotally mounted on the carrier supports 11, of the standard 1. The main driving shaft 10, has mounted at one end thereof a fly-wheel 12, and a pulley 13. The main driving shaft 10, is provided with a crank 14, to which is attached one end of a connecting rod 15, the other end being attached to a cross-head 18, in pivotal connection with a piston rod 17, of a compressor or air pump 16. The cross-head 18, has a range of sliding movement on a slide or way 19.

On the standard 1, between the cylinders 2, is located a heater 20, which by means of a pipe 21, is supplied from the compressor 16, with air to be heated and which by means of a pipe 22, is connected with valves 56, located beneath the pistons 4, of the cylinders 2. This heater 20, is fully illustrated in Fig. 3, in vertical section. The air issuing from the compressor 16, is led by means of the pipe 21, into the chamber 23, of the heater 20, and from which the same enters the inner compartment 24, of the heater, and passing the grate 25, leaves the heater in the direction indicated by the arrows in Fig. 3, from whence the same by means of the pipe 22, is led into the respective cylinders 2.

In the inner compartment 24, of the heater, is located the nozzle of an atomizer 26, which from the pump 28, by means of the pipe 27, is supplied with inflammable liquid or gas. This liquid or gas the moment it enters the compartment 24, of the heater, is lighted by means of the wires 29, due to the fact that an electric current is permitted to pass therethrough, whereby the said compressed air in the compartment 24, will be heated and expand sufficiently for use.

The grate 25, which is located in the top of the heater 20, is adapted to permit the passage of the air therethrough from the compartment 24, of the heater 20, to impart a considerable amount of its heat to the same, as will be readily understood from Fig. 3, of the drawings. In the bottom of the heater 20, are located insulators 30, of porcelain or other suitable material for the reception of the conductors 29, from a battery 31, or other suitable source of electric energy.

It may be here remarked that instead of employing the lighting device such as explained, it will be obvious that other lighting devices may be employed with most excellent results in the practice of my invention.

In the regulation of the speed of the engine by the turning of a valve of the pipe 27, by means of which, the heater will be supplied with a certain quantity of inflammable liquid or gas, the quantity of heat produced thereby and communicated to the air, and forced into the heater, will be increased or decreased according to the extent of the manipulation of the valve of the pipe 27. If a certain speed of the engine as hereinbefore described has been obtained, such can be maintained automatically by the following mechanism; the piston rod 33, of the pump 28, as illustrated in Figs. 4 and 5, is provided with a cross-arm 34, which has a range of sliding movement on the rod 37, which is carried by a forked arm 36. This arm is secured to the housing 35, of the pump. The upper end of the rod 37, is provided with a thread 38, in order to be screwed up and down in the forked arm 36, and which can be clamped in position by means of a nut 39. The spring 40, which is located on the rod 37, rests at its lower end against a shoulder 41, which is secured to said rod, and the upper end thereof is pressed against the cross-arm 34, of the piston rod 33, which is adapted to hold said rod of the pump at the highest point of the stroke thereof.

The upper end of the piston rod 33, is provided with a vertical projecting finger 42, preferably formed integral therewith and the free upper end of which finger engages a shoe 43, which is provided with integral projections or lugs 44, 45 and 46. This shoe by means of a bolt is pivotally connected with the rod 47, the upper end of which is attached to a lever arm 48, rigidly secured on the shaft 7, of the walking beam 5. It may be here remarked that the movement of the walking beam 5, by means of the pistons 4, of the cylinders 2, will be communicated to the lever arm 48, the rod 47 and the shoe 43, and in the downward movement of the shoe 43, one of the projections or lugs 44, 45 or 46 thereof, will be brought into engagement with the projecting finger 42, of the piston rod 33, which lugs or projections press the said piston rod 33, in a downward direction in the cylinder of the pump against the pressure of the spring 40, whereby a greater or less quantity of inflammable liquid or gas will be forced into the heater 20, as requirements demand, for heating up the impelling air therein and prior to the discharge thereof into the respective cylinders 2, of the engine, having the pistons 4, intermittently operating back and forth therein. When the shoe 43, is in vertical alignment with the piston rod 33, it will be understood from the drawings with special reference to Fig. 5, that the lower projection or lug 44, of the shoe 43, will be brought into engagement with the finger 42, and the said piston rod will receive its full stroke. When the shoe 43, is moved toward the left in Fig. 5, the projections or lugs 45 and 46, of the same will be brought into engagement with the finger 42, and the piston rod 33, will be shifted by said projections or lugs to a greater or less extent in the cylinder of the pump 28, according to the position of said rod therein. When the shoe 43, is moved so far toward the left in Fig. 5 that none of the projections or lugs will engage the finger 42, the piston rod 33, will remain at rest. Consequently according to the different positions of the piston rods 33, in the cylinders 2, it will be understood that a greater or less quantity of the inflammable liquid or gas will be forced by the same into the heater 20, or if the piston rod 33, be not actuated by the shoe 43, none of the inflammable liquid or gases can be forced into the same. The shoe 43, is provided with a downwardly projecting arm 52, suitably secured thereto and at the free end of which is connected a rod 51, attached at the upper end to a right angular lever 50. The lower arm 49, of said lever 50, is in engagement with a governor 32, of any suitable construction, for example, of the type illustrated in Fig. 1. The governor 32, in the rotation thereof will actuate the shoe 43, in a well understood manner and in a direction to the left in Fig. 5, whereby a regulation of the quantity of inflammable liquid or gas forced into the heater 20, will be obtained and maintained for effective action in the operation of the engine.

The mechanism for preventing destructive effects of hot air on the sliding surfaces of the pistons and the interior of the cylinders will now be described.

Each of the pistons 4, consists of several parts $a$, $b$, $c$, which are separated from each other by layers of insulating material $d$, so that the lower part $c$, of each piston, exposed to hot air, cannot communicate the heat thereof to the upper portion $a$, of the same. The upper part $a$, of each piston, is provided with packing rings $e$, which are in frictional contact with each of the cylinders 2, in order to render the same air tight, while the lower parts $b$ and $c$, of each of the pistons 4, are out of frictional contact with the cylinders 2, as clearly illustrated in Fig. 1. The upper part $a$, of each piston is provided with an annular recess or groove $f$, while each cylinder 2, is provided with a similar recess or groove $g$, which is supplied with cold water from the pump 53, by means of a pipe 54, one end of which is connected with said recess $g$, of the cylinder 2, while the other end is connected with the pump 53. The piston of each pump 53, is connected with rods 63 and 64, the upper ends of which are pivotally connected with the lever arm 48, of the shaft 7, carrying the walking beam 5, as illustrated in Fig. 1. It will thus be readily understood that the shaft 7 and lever arm 48, will actuate said pistons of the pump 53, which will feed the annular recesses $g$, of the cylinders 2, with cold water from a suitable source, in order to cool off the upper parts $a$, of the respective pistons, while the lower parts exposed to the influence of hot air will not be cooled. This, as will be observed, prevents lowering of the temperature of the acting force of the air in connection with the pistons in the cylinders 2. In the position of the pistons as illustrated in Fig. 1, the recesses or grooves $g$, are not in communication with the recesses or grooves $f$, of the respective pistons 4, located at suitable distances beneath the recesses or grooves $g$. While the pistons are moving upward toward the recesses or grooves $g$, of the respective cylinders 2, both recesses or grooves will be brought into communication with each other and the water of these recesses or grooves $g$, will be transferred to the recesses $f$, which by a downward movement of the pistons will release said water and by the influence of the hot air be transformed into steam. This steam will fill up the spaces between the lower parts $b$ and $c$, of the pistons 4, and the cylinders 2, as well as the compartment $h$, under the pistons and thus prevent entry of hot air to the upper parts $a$, of the respective cylinders 2, provided with packing rings $e$.

In order to protect the packings $j$, of the inlet valves 55, against the hot air, a stuffing box 75, is provided with a chamber 56, through which the cold air coming from the compressor 16, must pass before the same reaches the heater 20. The stuffing boxes 75, of the respective valves 55, will thereby be kept cool.

57, shows outlet valves through which the hot air after acting on the pistons of the respective cylinders 2, is led into the atmosphere.

58, is a shaft located in front of the standard 1, which shaft by means of the miter-gears 73 and 66, shaft 65, and miter-gears 67 and 68, is set in rotation from the main driving shaft 10, as clearly illustrated in Figs. 1 and 2. On the shaft 58, are secured eccentrics 59 and 60, by means of which the inlet valves 55 and outlet valves 57, are actuated and controlled.

61, shows pumps located on the standard 1, which by means of pipes 62, connected therewith supply the compressor 16, with the necessary quantity of cold water to cool off the same.

The type of engine hereinbefore explained is that of a double cylindered working beam engine, but it will be manifestly obvious from the foregoing description, that a greater number of working cylinders may be employed with good results.

It will also be manifestly obvious from the foregoing description of my invention that modifications may be made as to details thereof without departing from the spirit of the same; and hence I do not wish to be understood as limiting myself to the precise construction and arrangement of the parts of the engine as hereinbefore explained and illustrated in the drawings.

Having thus described the nature and objects of my invention, what I claim as new, and desire to secure by Letters Patent, is—

1. A caloric engine provided with two piston cylinders having inlet and outlet ports for hot air and with recesses or grooves formed in the upper part thereof, pistons consisting of certain parts and having complemental recesses or grooves formed therein for the reception of fluids to permit of the cooling thereof and so as to prevent communication of heat to certain of the parts of the pistons in sliding engagement with said cylinders, a heater provided with an atomizer, a compressor or pump and means for inflaming a fluid or gas in said heater, substantially as and for the purposes set forth.

2. A caloric engine provided with a pump for supplying oil to the burner of a heater having a spring controlled piston rod and a projecting finger engaged by the projections of a shoe and controlled by a governor, and means for actuating said shoe, substantially as and for the purposes set forth.

3. A caloric engine provided with two piston cylinders, a separate heater, a pump for supplying oil to the burner of said heater having a spring controlled piston rod and a projecting finger adapted to be engaged by the projections of a shoe and controlled by a governor, and means for actuating said shoe, substantially as and for the purposes set forth.

4. A caloric engine having piston cylinders, a separate heater provided with an atomizer for heating the air by inflammable fluids or gases, electrical means for inflaming the same, pipe connections between said heater and cylinders, inlet valves for said air having stuffing boxes provided with chambers through which cold air is conducted for cooling the same, and a compressor or pump for automatically supplying air to said heater, substantially as and for the purposes set forth.

5. A caloric engine having piston cylinders provided with inlet and outlet ports for hot air, recesses or grooves in said cylinders and adapted for the reception of fluids to permit of the cooling thereof, pistons consisting of certain parts having complemental recesses or grooves adapted for containing a fluid to permit of the cooling thereof and so as not to communicate heat to certain parts of the pistons in sliding engagement with said cylinders, a separate air heater provided with an atomizer for heating air by inflammable fluids or gases conveyed thereto by means of a compressor or pump, suitable connections between said cylinders and heater, and means for inflaming said fluids or gases, substantially as and for the purposes set forth.

6. A caloric engine provided with a heater having an internal compartment with inlet ports in the bottom thereof and outlet ports in the top, grate bars in the upper portion thereof, means for forcing air into said compartment and permitting of the ignition of an inflammable fluid or gas in the presence thereof and superheating said air in its passage through and about said grate bars and preparatory to the delivery thereof to the cylinders of the engine, substantially as and for the purposes set forth.

7. A caloric engine provided with two piston cylinders, means for actuating the pistons thereof, a separate heater provided with an outer casing, an inner casing having internal outlets and downwardly projecting channels or chambers with grate bars formed in the upper part of said casing constituting the compartment of the heater and inlets in the bottom of said casing for the admission of air into the interior of said compartment heated by an inflammable fluid or gas, substantially as and for the purposes set forth.

8. In a caloric engine, a piston-pump having a piston rod provided with a cross-arm engaging a rod provided with a spring and the upper portion of said rod threaded for the reception of a nut and a carrier connected with the casing of said pump and engaging with said rod, whereby the upward stroke of the piston of said pump is controlled, substantially as and for the purposes set forth.

In testimony whereof I have hereunto set my signature in the presence of two subscribing witnesses.

WADIM PAWLOWITCH ARSCHAULOFF.

Witnesses:
CHARLES JONAS,
M. DIXON.